United States Patent [19]

Tomino et al.

[11] Patent Number: 4,457,609
[45] Date of Patent: Jul. 3, 1984

[54] DEVICE FOR COUPLING A LENS BARREL AND A CAMERA BODY

[75] Inventors: Naoki Tomino; Makoto Kimura, both of Tokyo; Kenichi Magariyama, Yokohama; Yoshiharu Shiokama, Kawasaki; all of Japan

[73] Assignee: Nippon Kogaku K.K., Tokyo, Japan

[21] Appl. No.: 433,222

[22] Filed: Oct. 7, 1982

[30] Foreign Application Priority Data

Oct. 13, 1981 [JP] Japan .................................. 56-163079
Oct. 30, 1981 [JP] Japan .................................. 56-172775
Oct. 30, 1981 [JP] Japan .................................. 56-172777

[51] Int. Cl.³ .......................... G02B 7/02; G03B 17/12
[52] U.S. Cl. .................................... 354/286; 350/257
[58] Field of Search ................. 354/46, 286; 350/257

[56] References Cited
U.S. PATENT DOCUMENTS 4,104,649 8/1978 Tanaka et al. .................. 354/286 X Primary Examiner—John Gonzales
Attorney, Agent, or Firm—Fitzpatrick, Cella, Harper & Scinto

[57] ABSTRACT

A device for electrically connecting a lens barrel and a camera body includes a connector provided integrally with the fixed cylinder of the lens barrel along the cylindrical surface of the fixed cylinder. The connector has a movable contact resiliently displaceable in the diametral direction of the cylinder. The movable contact is urged against a contact piece provided on the camera body upon completion of the mounting of the lens barrel to the camera body. The camera body is provided with an inclined surface for displacing the movable contact in the diametral direction against the resilient force during the mounting operation of the lens barrel to the camera body.

13 Claims, 17 Drawing Figures

DEVICE FOR COUPLING A LENS BARREL AND A CAMERA BODY

BACKGROUND OF THE INVENTION

1. Field of the Invention

This invention relates to a device for coupling the lens barrel and camera body of a camera having an interchangeable picture-taking lens, and more particularly to a device for enabling the connection between the electrical device of the lens barrel and the electrical device of the camera body to result from the mounting of the lens barrel to the camera body.

2. Description of the Prior Art

With the advance of electronic technology, it has become introduced into exposure adjustment, distance adjustment, etc. in both still cameras and cinecameras and connector devices of various constructions have recently been proposed for connecting the electrical device of the lens barrel and the electrical device of the camera body. These proposed connector devices may generally be grouped into two types, namely, a type which has a fixed contact on the lens barrel side and a movable contact on the camera body side and a type which has a movable contact on the lens barrel side and a fixed contact on the camera body side. The former type is simple in construction of the lens barrel side but complex in construction of the camera body side and it involves an extreme difficulty to provide a connector having such a movable contact within a camera body side mount which does not have a sufficient space. Also, in the latter type, the movable contact of known construction is provided on the end surface of the lens barrel opposed to the mount portion of the camera body which is perpendicular to the optical axis while being biased by a spring and is constructed so as to be displaceable in the direction of the optical axis. In the conventional connector device so constructed, particularly in the case of a lens barrel having a large exit pupil diameter, a sufficient space cannot be secured on the end surface on which the movable contact is provided and therefore, it has been difficult to provide a number of contacts.

SUMMARY OF THE INVENTION

It is an object of the present invention to provide an improved device for electrically connecting a lens barrel and a camera body with the mounting of the lens barrel to the camera body.

The device of the present invention includes a connector provided integrally with the fixed cylinder of the lens barrel along the cylindrical surface of the fixed cylinder, and the connector has a movable contact resiliently displaceable in the diametral direction of the cylinder. The movable contact is urged against a contact piece provided on the camera body upon completion of the mounting of the lens barrel to the camera body.

In a preferred embodiment of the present invention, the camera body is provided with an inclined surface for displacing the movable contact in the diametral direction against the resilient force during the mounting operation of the lens barrel to the camera body. Thereby, the displacement of the movable contact associated with the mounting operation achieved by moving the lens barrel relative to the camera body in the direction of the optical axis and/or about the optical axis is made possible.

The invention will become more fully apparent from the following detailed description thereof taken in conjunction with the accompanying drawings.

DESCRIPTION OF THE PREFERRED EMBODIMENTS

Figure 1:
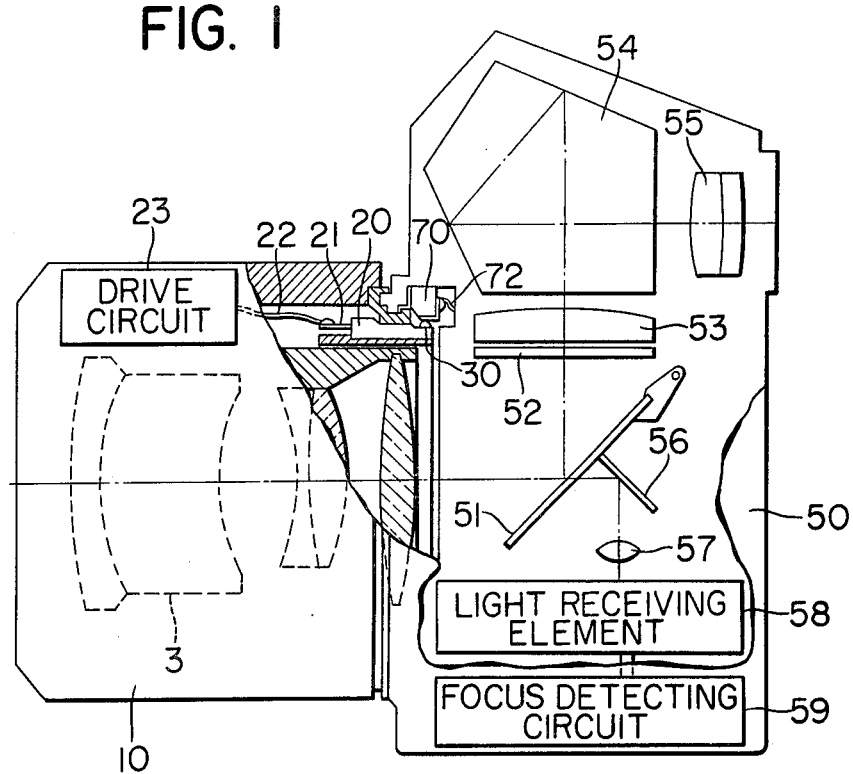
FIG. 1 is a partly cross-sectional view of a camera according to an embodiment of the present invention.

FIG. 1 shows an embodiment in which the present invention is applied to an autofocus single lens reflex camera. An interchangeable lens barrel 10 is removably mounted to a camera body 50. Part of a light beam passed through a picture-taking lens system 3 is reflected by a movable mirror 51 having a semi-transmittal portion and enters a viewfinder optical system, and then arrives at the photographer's eye via a focus screen 52, a condenser lens 53, a pentaprism 54 and an eyepiece 55. The remainder of the light beam passes through the semi-transmittal portion of the mirror 51 and enters a light-receiving element 58 via a reflecting mirror 56 and a lens 57, and judgment of in-focus is effected in a focus detecting circuit 59 by the output of the light-receiving element 58. All this is a known technique and need not be described any further.

Figure 2:
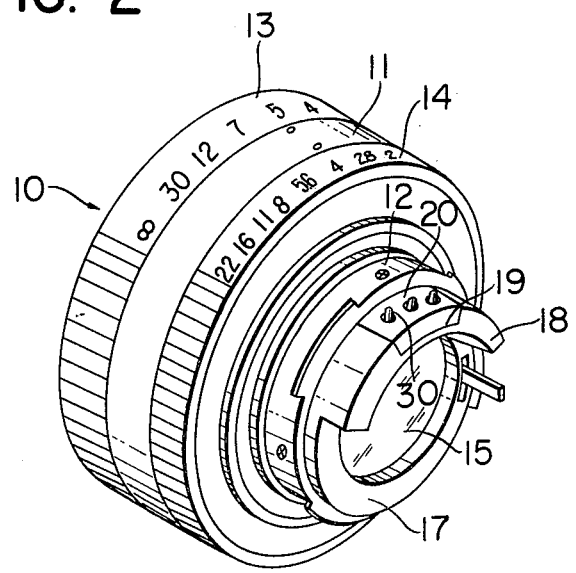
FIG. 2 is a perspective view showing the lens barrel of FIG. 1.
Figure 3:
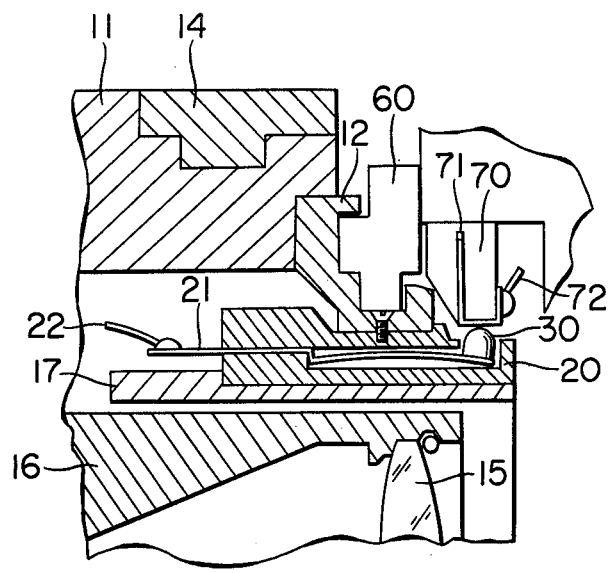
FIG. 3 is a cross-sectional view showing the essential portions of FIG. 1.

As shown in FIGS. 2 and 3, the lens barrel 10 is provided with a fixed barrel 11 having a bayonet mount 12 to be coupled to the camera body, and a distance adjusting ring 13 and an aperture adjusting ring 14 are rotatably provided on the barrel 11. When the distance adjusting ring 13 is rotated, a movable lens barrel 16 holding a movable lens 15 is moved in the direction of the optical axis, thus accomplishing focus adjustment. A fixed lens protecting cylinder 17 is formed between the movable lens barrel 16 and the bayonet mount 12, and a portion thereof projects from the end surface of the bayonet mount to form a projected portion 18. A contact holding member 20 of non-conducting material is inserted in a cut-way 19 formed in the projected portion 18 and is fixed to the inner surface of the bayonet mount 12 by small screws. A movable contact piece 21 of good electrical conducting material and having resiliency is secured to the contact holding member 20 and connected by a cord 22 to a drive circuit 23 which controls the rotation of a motor for moving the lens. A semi-spherical contact 30 of very low electrical resistance is welded to the free end of the movable contact piece 21. The contact holding member 20 and the movable contact piece 21 having a contact 30 are made into a unit which forms a connector. On the other hand, a contact piece holding member 70 of insulative material holding a contact piece 71 of conducting material is provided in a mount 60 on the camera body side and connected to the focus detecting circuit 59 by a cord 72 connected to the contact piece 71.

When the lens barrel and the camera body are coupled together through the bayonet mounts 12 and 60 as shown in FIG. 3, the contact 30 and the contact piece 71 are brought into contact with each other with a predetermined contact pressure by the radial resiliency of the movable contact piece 21 centered at the optical axis, whereby there is brought about a conductive state. In this embodiment, the contact holding member 20 is fixed to the inner surface of the bayonet mount 12, but alternatively, the contact holding member 20 may be provided on the outer surface of the lens protecting cylinder 17 integral with the fixed barrel.

Plural sets of movable contact pieces 21 and contacts 30 are disposed in accordance with the quantity of the signal transmitted between the camera body and the lens barrel. The lens barrel of FIG. 2 has a connector in which three contacts are disposed, and the lens barrel shown in FIG. 4 has a connector in which five contacts 130 are disposed.

The construction of the connector made into a unit will hereinafter be described in detail with respect to some embodiments thereof. In the connector shown in FIG. 5, five movable contact pieces 121 each formed in the shape of a crank are parallel-disposed on a holding member 120 so that the free ends thereof having contacts 130 are bent in the opposite direction from the fixed ends 131 with respect to the direction of mounting rotation indicated by arrow. Therefore, in this embodiment, during the rotative mounting of the lens barrel onto the camera, the influence of the torsion of each contact piece is reduced, whereby the connection with the contact piece 71 on the camera body side is accomplished smoothly and reliably.

Figure 6:
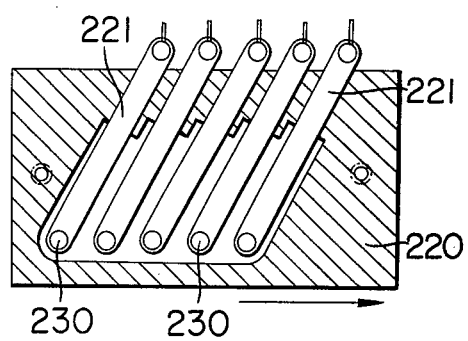
FIG. 6 is a cross-sectional plan view showing a modification of the connector.

The connector shown in FIG. 6 includes a holding member 220 in which are disposed five movable contact pieces 221 obliquely juxtaposed and having contacts 230, and this makes the working easier.

Figure 5:
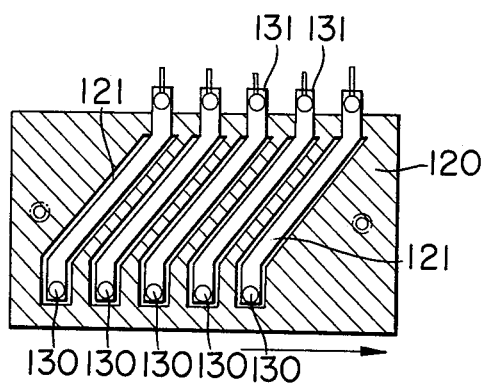
FIG. 5 is a cross-sectional plan view showing the connector of the lens barrel of FIG. 4.
Figure 7A:
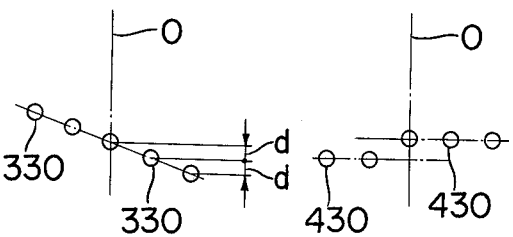
FIG. 7A is a model view showing the arrangement of contacts according to a first modification of the connector.
Figure 7B:
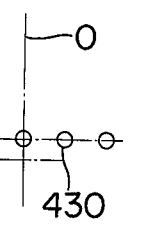
FIG. 7B is a model view showing the arrangement of contacts according to a second modification of the connector.
Figure 7C:
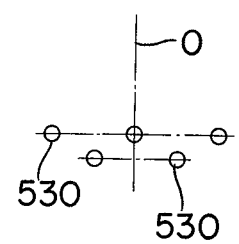
FIG. 7C is a model view showing the arrangement of contacts according to a third modification of the connector.

Another modification will be described with respect to the arrangement of a plurality of contacts. The contacts 330 shown in FIG. 7A are arranged on a circumference inclined by a predetermined angle relative to the optical axis O, the contacts 430 shown in FIG. 7B are separately arranged on two circumferences perpendicular to the optical axis O, and the contacts 530 shown in FIG. 7C are staggered on two circumferences perpendicular to the optical axis. That is, the contacts 130 and 230 of FIGS. 5 and 6 are arranged in a row in the rotational direction (arrow) and therefore, the contact lying at the right end may contact the five contact pieces on the camera body side in succession with the rotation thereof and thus may be abraded. In contrast, if the contacts are arranged with an interval d in the direction perpendicular to the rotational direction (arrow) as are the contacts 330 of FIG. 7A, the above-mentioned disadvantage will not occur. Also, if the contacts are arranged as shown in FIG. 7C, the abrasion of the numerous contacts will be reduced to one half as compared with the case of FIG. 5.

Figure 8A:
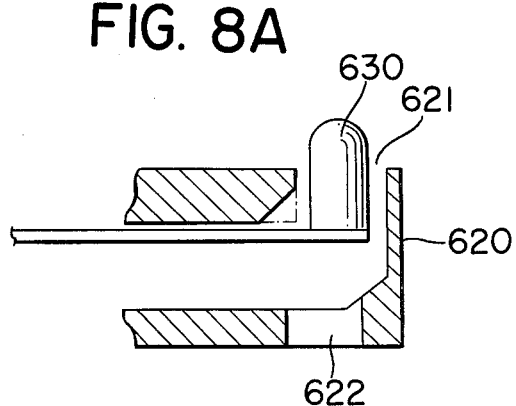
FIG. 8A is a cross-sectional view showing a fourth modification of the connector.
Figure 8B:
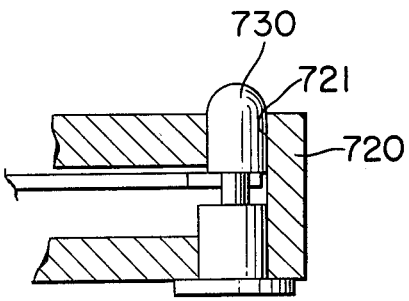
FIG. 8B is a cross-sectional view showing a fifth modification of the connector.
Figure 8C:
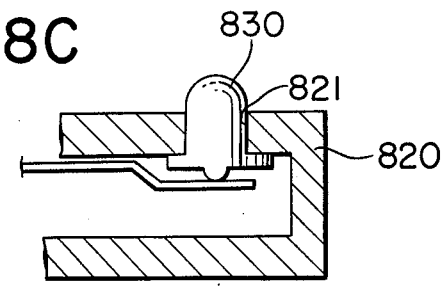
FIG. 8C is a cross-sectional view showing a sixth modification of the connector.

Referring to FIG. 8, there are shown modifications of the construction of the contact portion of the connector. The connector shown in FIG. 8A has a holding member 620 provided with a cleaning hole 622 used when dust or the like enters from a hole 621 through which a contact 630 extends. The connectors of FIGS. 8B and 8C have contacts 730, 830 formed separately from a movable contact piece to prevent entry of dust or the like, the outer periphery of the contact 730, 830 being slidable in the through-hole 721, 821 of holding member 720, 820.

Figure 9:
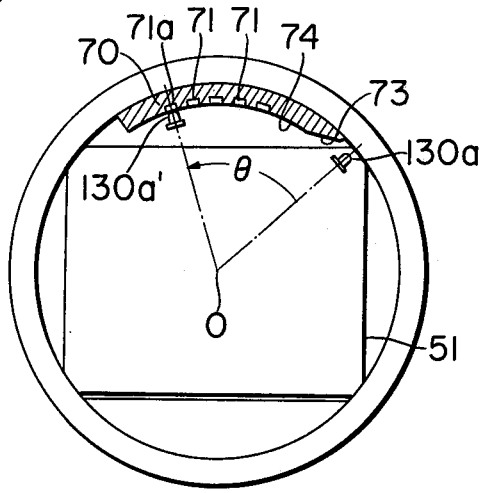
FIG. 9 is a front view showing the lens mount portion of the camera body according to an embodiment of the present invention.

Description will now be made in detail of the construction of the contact pieces of the camera body which make contact with the contact of the above-described lens barrel. As shown in FIG. 9, a holding member 70 having contact pieces 71 is fixed along the inner periphery of the lens mounting opening of the camera body. The holding member 70 is of an arcuate shape and a cam surface 73 gradually changing in diameter in the circumferential direction is formed on one end of the holding member 70. A suitable number of contact pieces 71 connected to the focus detecting circuit of FIG. 1 are embedded in the inner peripheral surface of the holding member 70, and the surface thereof is smoothly formed relative to the surface 74 of the holding member 70.

Figure 4:
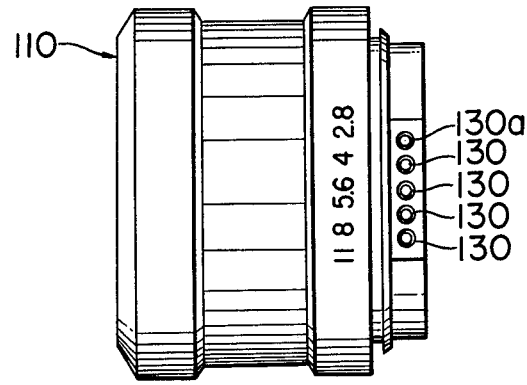
FIG. 4 is a plan view showing another embodiment of the lens barrel.

When a lens barrel 110 as shown in FIG. 4 is to be mounted to the camera body 50, it is inserted from a rotated position about the optical axis so that none of the movable contacts 130 of the lens barrel 110 contacts the holding member 70. Thereafter, when the lens barrel 110 is leftwardly turned by an angle θ about the optical axis O, the contact 130a comes into contact with the cam surface 73 of the holding member 70 in that process and is radially inwardly displaced against the resiliency of a movable contact piece 121 and rides onto the surface 74. Accordingly, upon completion of the rotation of the lens barrel 110 through the angle θ, the contact 130a moves to a position 130a' and contacts a contact piece 71a. At this point of time, all contacts 130 come into contact with all contact pieces 71 and accordingly, the focus detecting circuit 59 and the lens driving circuit 23 conduct and movement of the picture-taking lens 3 becomes possible depending on the in-focus.

Figure 10:
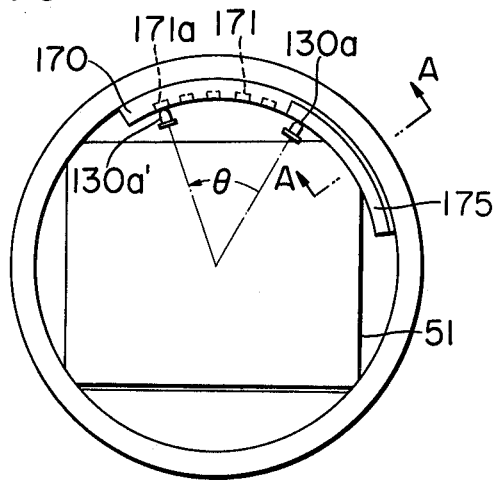
FIG. 10 is a front view showing the lens mount portion of the camera body according to another embodiment of the present invention.
Figure 11:
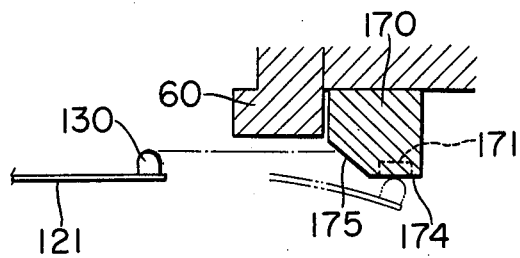
FIG. 11 is a cross-sectional view taken along line A—A of FIG. 10.
Figure 12:
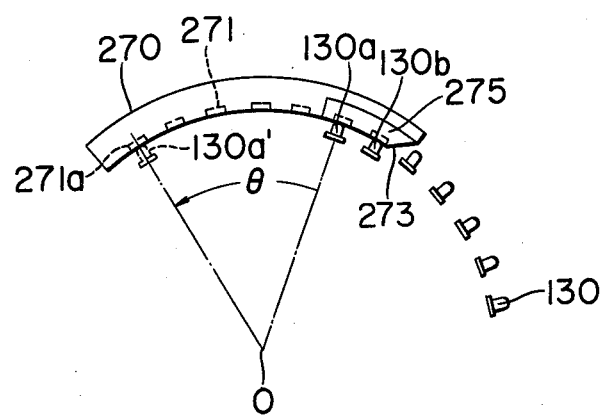
FIG. 12 is a front view showing a modification of the contact piece holding member of the camera body.
Figure 13:
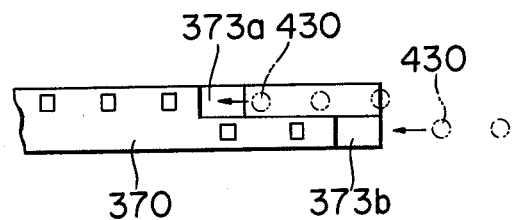
FIG. 13 is a plan view showing another modification of the contact piece holding member.

The holding member 170 of the camera body shown in FIG. 10 comprises a first area in which contact pieces 171 are disposed and a second area extending from the first area in the circumferential direction to support the contact 130 of the lens barrel on the surface of the holding member. A cam surface 175 inclined in the direction of the optical axis and provided in opposed relationship with the picture-taking lens, instead of the cam surface 73 of FIG. 9, is formed in the second area substantially over the entire region thereof. Accordingly, when the lens barrel as shown in FIG. 4 is made to bear against the camera body in the direction of the optical axis so that all contacts 130 are in contact with the cam surface 173, the contacts 130 ride onto the surface 174 of the holding member while being guided by the cam surface, as shown in FIG. 11. When the lens barrel is leftwardly turned from this position by an angle θ about the optical axis, the contact 130a of the lens comes into contact with the contact piece 171a of the camera body, thus completing the mounting.

Where it is necessary to increase the width of the aforementioned first area because the number of the contacts of the lens barrel and of the contact pieces of the camera body is great, design may be made as shown in FIG. 12. That is, a holding member 270 is provided with both a cam surface 273 similar to the cam surface 73 of FIG. 9 and a cam surface 275 similar to the cam surface 175 of FIG. 10. Accordingly, when the lens barrel is made to bear against the camera body in the direction of the optical axis, contacts 130a and 130b are guided by the cam surface 275 and ride onto the surface of the holding member 270 and, when the lens barrel is rotated from this position by an angle θ about the optical axis, the remaining contacts are successively caused to ride onto the surface of the holding member 270 by the cam surface 273 and the contact 130a comes into contact with the contact piece 271a, thus completing the mounting.

Where the contacts of the lens barrel are arranged as shown in FIGS. 7A to 7B, it is necessary that the contact pieces of the camera body be provided at positions corresponding thereto. In that case, for example, if the contact pieces are arranged in the same manner as the contacts 430 of FIG. 7B, a holding member 370 as shown in FIG. 13 wherein cam surfaces 373a and 373b are separately formed for each group may be prepared.

The movable contact provided on the lens barrel need not always be an electrical contact, but may be one used for other purposes. For example, the movable contact can be used also as a click stop for determining the rotation terminating position of the lens mount or for the purpose of producing a contact pressure for pressing the mounting reference surface on the camera body side and the mounting reference surface on the lens barrel side during the mounting.

We claim:

1. A camera having a picture-taking lens barrel removably mounted to a camera body and provided with a mount fitted to the mount of the camera body by sliding it relative to the mount of the camera body in a predetermined direction from a predetermined position, said camera comprising:
(a) movable contact means disposed near the mount of said lens barrel and resiliently displaceable in the diametral direction of a circle centered at the optical axis of the lens;
(b) an inclined surface disposed near the mount of said camera body and opposed to the direction of said sliding movement and capable of contacting said movable contact means to displace said movable contact means during the sliding movement of the mount of said camera body and the mount of said lens barrel during said mounting; and
(c) contact piece means provided at a position adjacent to said inclined surface capable of being coupled to said movable contact means displaced at the time of completion of said mounting.

2. A camera according to claim 1, wherein said lens barrel has a cylindrical surface centered at the optical axis of the lens and fixedly formed with respect to the mount of said lens barrel near said mount, and said movable contact means is disposed on said cylindrical surface.

3. A camera according to claim 1, wherein said sliding movement of the mount of said lens barrel for the fitting thereof to the mount of said camera body includes the sliding movement thereof in the direction of the optical axis of the lens, and said inclined surface includes a surface inclined relative to the direction of said optical axis.

4. A camera according to claim 1, wherein the sliding movement of the mount of said lens barrel for the fitting thereof to the mount of said camera body includes the rotation thereof about the optical axis of the lens, and said inclined surface includes a surface inclined relative to a circumferential direction centered at said optical axis.

5. A camera according to claim 3, wherein the sliding movement of the mount of said lens barrel for the fitting thereof to the mount of said camera body includes the rotation thereof about the optical axis of the lens, and said inclined surface includes a surface inclined relative to a circumferential direction centered at said optical axis.

6. A camera according to claim 3, wherein said movable contact means includes a plurality of contacts disposed at predetermined intervals on the same circumference centered at the optical axis of the lens, and said inclined surface is provided so as to be capable of contacting at least one of said plurality of contacts during said sliding movement.

7. A camera according to claim 1, wherein said movable contact means and said contact piece means are electrical contacts electrically connected together during the coupling thereof.

8. A picture-taking lens barrel having around the optical axis an annular mount to be removably mounted to a camera body provided with an electrical device, said lens barrel comprising:
(a) a member including a cylindrical surface centered at said optical axis and fixedly formed with respect to said mount near said mount;
(b) electrical circuit means; and
(c) connector means connected to said circuit means and coupled to said electrical device during the mounting to said camera body, said connector means including movable contact means disposed on said cylindrical surface of said member and resiliently displaceable in the diametral direction of said cylinder.

9. A picture-taking lens barrel according to claim 8, wherein said movable contact means includes a band-like good electrical conductor provided along said cylindrical surface, said good electrical conductor having one end fixed to said member and the other end having an electrical contact and displaceable in said diametral direction.

10. A picture-taking lens barrel according to claim 8, wherein said movable contact means includes a plurality of band-like good electrical conductors juxtaposed along said cylindrical surface.

11. A picture-taking lens barrel according to claim 10, wherein said plurality of band-like good electrical conductors are juxtaposed inclinedly relative to the circumferential direction of said cylindrical surface.

12. A picture-taking lens barrel according to claim 10, wherein each of said good electrical conductors has one end fixed to said member and other ends each having an electrical contact and displaceable in said diametral direction, at least one other end of each of said good electrical conductors being biased in the direction of the optical axis relative to the remaining other ends.

13. A picture-taking lens barrel according to claim 9, wherein said good electrical conductor is formed by a member having resiliency.

* * * * *